(12) United States Patent
Shih

(10) Patent No.: US 7,710,612 B2
(45) Date of Patent: *May 4, 2010

(54) METHOD OF EFFACING ZIPPER IMAGE

(76) Inventor: Chen-Hsiang Shih, No. 37-3, Yung-Feng Lane, Ho-Ming Village, Hsiu-Shui Hsiang, Chang-Hua Hsien (TW)

( * ) Notice: Subject to any disclaimer, the term of this patent is extended or adjusted under 35 U.S.C. 154(b) by 1007 days.

This patent is subject to a terminal disclaimer.

(21) Appl. No.: 11/334,640

(22) Filed: Jan. 17, 2006

(65) Prior Publication Data

US 2006/0119904 A1 Jun. 8, 2006

Related U.S. Application Data

(63) Continuation of application No. 10/047,680, filed on Jan. 14, 2002, now Pat. No. 7,012,720.

(51) Int. Cl.
*H04N 1/40* (2006.01)
*G06K 9/40* (2006.01)

(52) U.S. Cl. .................. 358/447; 358/474; 358/483; 382/269; 382/275

(58) Field of Classification Search ............... 358/3.26, 358/3.27, 474, 447, 463, 465, 466, 443, 483; 382/267–269, 275
See application file for complete search history.

(56) References Cited

U.S. PATENT DOCUMENTS

| 4,326,258 | A | * | 4/1982 | de la Guardia ............... 382/137 |
| 4,628,211 | A | | 12/1986 | Ruppert |
| 4,703,363 | A | | 10/1987 | Kitamura |
| 4,734,583 | A | | 3/1988 | Wang et al. |
| 4,774,569 | A | | 9/1988 | Morton et al. |
| 4,873,570 | A | | 10/1989 | Suzuki et al. |
| 4,953,014 | A | | 8/1990 | Takaragi |
| 4,974,072 | A | | 11/1990 | Hasegawa |
| 5,014,333 | A | * | 5/1991 | Miller et al. ................ 382/252 |
| 5,031,227 | A | * | 7/1991 | Raasch et al. ............... 382/199 |
| 5,055,855 | A | | 10/1991 | Nishio |
| 5,070,414 | A | | 12/1991 | Tsutsumi |
| 5,355,164 | A | | 10/1994 | Shimoyama et al. |

(Continued)

FOREIGN PATENT DOCUMENTS

JP 10051603 2/1998

(Continued)

OTHER PUBLICATIONS

U.S. Appl. No. 10/714,634 "Apparatus for Reducing Zipper of Image and Method Thereof". Chang et al.*

(Continued)

*Primary Examiner*—Cheukfan Lee
(74) *Attorney, Agent, or Firm*—Stolowitz Ford Cowger LLP

(57) ABSTRACT

A method of effacing zipper image, applicable to scan a document by a scanner with a stagger charge-coupled device. The nth (n is a positive integer) pixel value obtained by scan on a scan line at which the zipper image is produced is subtracted by the (n+1)th pixel value obtained by scan on the scan line. The absolute value of the result is then compared to a critical value. If the result is smaller than the critical value, the nth pixel is modified by the method.

19 Claims, 3 Drawing Sheets

U.S. PATENT DOCUMENTS

| | | | |
|---|---|---|---|
| 5,404,233 A * | 4/1995 | Nagata et al. | 358/447 |
| 5,528,274 A | 6/1996 | Hyodo | |
| 5,528,296 A | 6/1996 | Gove et al. | |
| 5,610,403 A | 3/1997 | Kingsley et al. | |
| 5,673,336 A | 9/1997 | Edgar et al. | |
| 5,703,845 A | 12/1997 | Audoin et al. | |
| 5,859,712 A | 1/1999 | Kim | |
| 5,870,142 A | 2/1999 | Noda et al. | |
| 5,881,182 A | 3/1999 | Fiete et al. | |
| 5,920,646 A | 7/1999 | Kamon | |
| 5,940,125 A | 8/1999 | Suganuma | |
| 5,995,675 A | 11/1999 | Hwang | |
| 6,034,724 A | 3/2000 | Nakamura | |
| 6,034,794 A | 3/2000 | Suganuma | |
| 6,034,795 A | 3/2000 | Smitt | |
| 6,081,625 A | 6/2000 | Sakaue | |
| 6,115,147 A | 9/2000 | Mizumoto et al. | |
| 6,144,469 A | 11/2000 | Suganuma | |
| 6,205,248 B1 * | 3/2001 | Vieth | 382/232 |
| 6,212,303 B1 * | 4/2001 | Doran et al. | 358/426.16 |
| 6,233,011 B1 * | 5/2001 | Su | 348/254 |
| 6,288,797 B1 | 9/2001 | Ueno | |
| 6,316,761 B1 | 11/2001 | Yamaguchi | |
| 6,330,081 B1 | 12/2001 | Scholten | |
| 6,496,286 B1 | 12/2002 | Yamazaki | |
| 6,507,364 B1 | 1/2003 | Bishay et al. | |
| 6,567,192 B1 | 5/2003 | Toyomura et al. | |
| 6,606,172 B1 | 8/2003 | Moro | |
| 6,646,681 B1 | 11/2003 | Macy et al. | |
| 6,665,454 B1 | 12/2003 | Silverbrook et al. | |
| 6,674,903 B1 | 1/2004 | Cliquet | |
| 6,678,000 B1 | 1/2004 | Sakata | |
| 6,744,916 B1 | 6/2004 | Takahashi | |
| 6,894,812 B1 | 5/2005 | Spears | |
| 6,965,463 B1 | 11/2005 | Moritaku et al. | |
| 7,177,482 B2 * | 2/2007 | Ohki et al. | 382/269 |
| 7,203,379 B1 | 4/2007 | Najand | |
| RE40,179 E * | 3/2008 | Kim | 382/268 |
| 2002/0085217 A1 | 7/2002 | Sakaue et al. | |
| 2002/0093581 A1 | 7/2002 | Ikeda et al. | |
| 2002/0186422 A1 | 12/2002 | Chang et al. | |
| 2003/0048958 A1 | 3/2003 | Ishiguro | |
| 2003/0063201 A1 | 4/2003 | Hunter et al. | |
| 2004/0096099 A1 | 5/2004 | Chang et al. | |

FOREIGN PATENT DOCUMENTS

JP 2001201324 7/2001

OTHER PUBLICATIONS

USPTO; File History; U.S. Appl. No. 11/502,133 to Shih, filed Aug. 9, 2006.

USPTO; File History; U.S. Appl. No. 10/013,887 to Shih, filed Dec. 10, 2001.

USPTO; File History; U.S. Appl. No. 10/047,680, filed Jan. 14, 2002.

Zhang et al, "Color Imaging for Digital Cameras With a Single CCD Sensor", Oct. 2000, Industrial Electronics Society, vol. 3, pp. 2007-2012.

Bae et al, "3CCD Interpolation Using Selective Projection", Mar. 2005, Acoustics, Speech, and Signal Processing, vol. 3, pp. ii/605-ii/608.

Harada et al, "A High-Resolution Staggered-Configuration CCD Imager Overlaid with an a-Si:H Photoconductive Layer", Aug. 1985, IEEE Transactions on Electron Devices, vol. 32, Issue 8, pp. 1499-1504.

Yuzuki et al, "A 5732-Element Linear CCD Image Sensor", Aug. 1985, IEEE Transactions on Electron Devices, vol. 32, Issue 8, pp. 1541-1545.

* cited by examiner

METHOD OF EFFACING ZIPPER IMAGE

This is a Continuation Patent Application of U.S. patent application Ser. No. 10/047,680 filed Jan. 14, 2002 now U.S. Pat. No. 7,012,720 titled, "Method of Effacing Zipper Image" by Chen-Hsiang Shih assigned to the assignee of claimed subject matter.

BACKGROUND OF THE INVENTION

1. Field of the Invention

The invention relates in general to a method of effacing zipper image, and more particularly, to a method of effacing zipper image by approximating the gray scales of two neighboring pixels.

2. Description of the Related Art

FIG. 1 shows a block diagram of a scanner having a stagger charge-coupled device. In FIG. 1, the scanner 100 is coupled to a computer 150. The scanner comprises a stagger charge-coupled device 110 with a primary line and a secondary line, an application specific integrated circuit (ASIC) 120, an image compensation buffer 130 and an I/O interface 140.

When the scanner having the stagger charge-coupled device is scanning a document, the pitch between the primary line and the secondary line is small. The primary line is thus affected by the light reflected from the secondary line. Similarly, the secondary line is also affected by the light reflected from the primary line. A zipper image (as shown in FIG. 3) in addition to a real image (as shown in FIG. 2) is thus produced by using the scanner with the stagger charge-coupled device to scan the document. When a document has a black-and-white boundary, the zipper image is more obvious, causing error in the actual image. Currently, a method to compensate the zipper image has not been found in the prior art.

SUMMARY OF THE INVENTION

The invention provides a method of effacing a zipper image by approximating the gray scales of two neighboring pixels.

The method of effacing the zipper image provided by the invention is applicable to scan a document using a scanner with a stagger charge-coupled device. The nth pixel obtained by scan on a scan line at which the zipper image is produced is subtracted by the (n+1)th pixel obtained by scan on the scan line. The absolute value of the subtraction result is compared to a critical value. When the result is smaller than the critical value, the nth pixel is modified as the nth pixel after process. If the result is larger than the critical value, no process is performed.

The processed nth pixel is one half of the sum of the nth pixel obtained by scan and the (n+1)th pixel obtained by scan.

In one embodiment of the present invention, the nth pixel after being processed is the sum of one half of the nth pixel obtained by scan and one half of the (n+1)th pixel obtained by scan.

In one embodiment of the present invention, the critical value is a predetermined value or produced by a logic circuit. The critical value can be adjusted according to the modulation transfer function of the scanner with the stagger charge-coupled device.

Both the foregoing general description and the following detailed description are exemplary and explanatory only and are not restrictive of the invention, as claimed.

DESCRIPTION OF THE PREFERRED EMBODIMENTS

Figure 1:
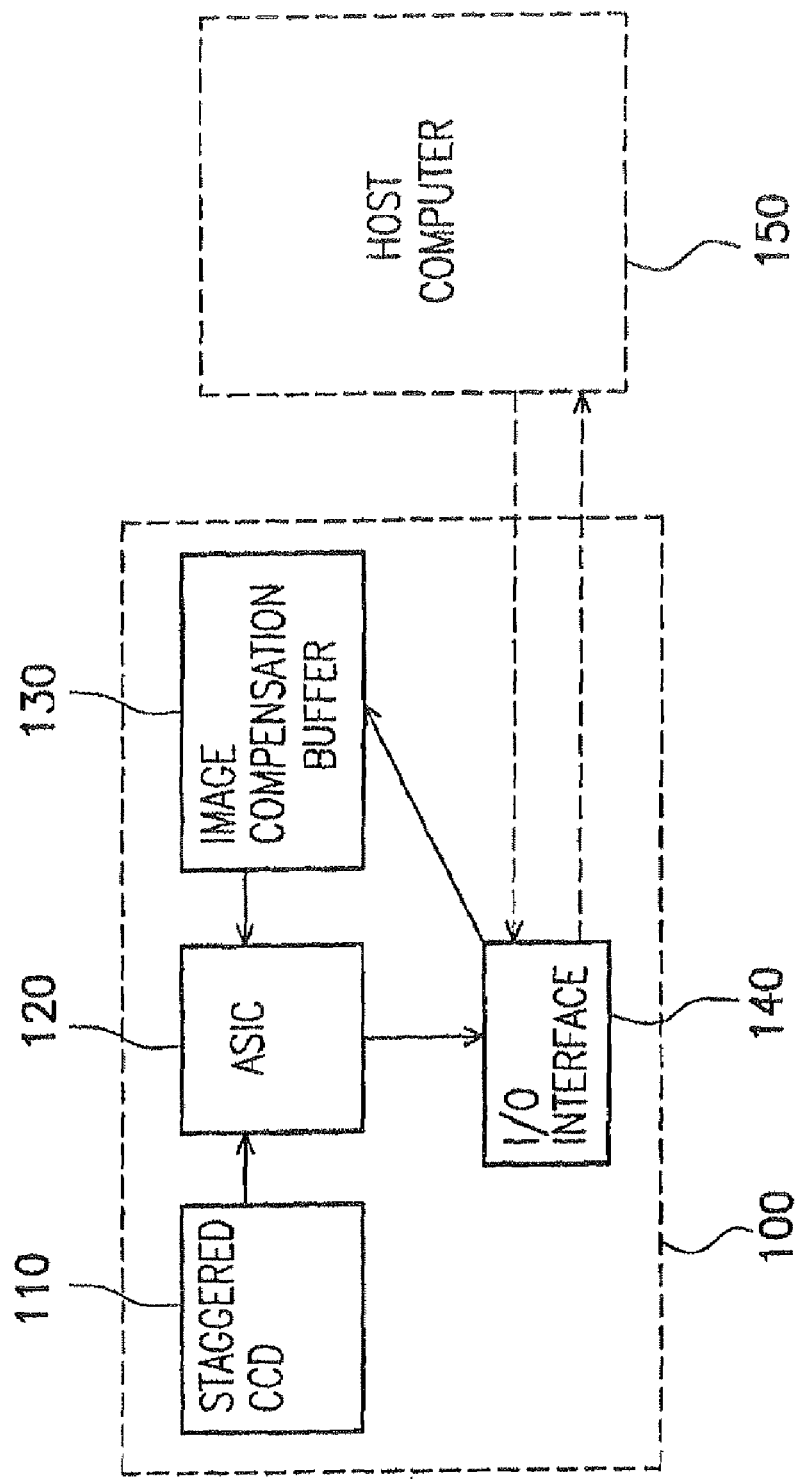
FIG. 1 shows a block diagram of a scanner with a stagger charge-coupled device.
Figure 2:
FIG. 2 shows a real image of a document.
Figure 3:
FIG. 3 shows a zipper image produced by scanning the document using a scanner with a stagger charge-coupled device.

Referring to FIG. 1, a compensation operation is performed on a document before the document is scanned by a scanner 100 with a stagger charge-coupled device 110. Thereby, an image compensation parameter is obtained and stored in a computer 150. When the stagger charge-coupled device 110 performs the scan on any part of the document, an image compensation parameter corresponding to the scanned part is retrieved from the computer 150 and transmitted to the image compensation buffer 130 via the I/O interface 140. The staggered scanned image obtained from the stagger scan by the stagger charge-coupled device 110 is then corrected by the ASIC 120 according to the image compensation parameter transmitted from the image compensation buffer 130. The corrected image is then transmitted to the computer 150 via the I/O interface 140 for storage.

However, as the distance between the primary line and the secondary line is very short, the primary line is affected by the light reflected from the secondary line. Similarly, the secondary line is also affected by the light reflected from the primary line. A zipper image is thus produced to cause an error between the scanned image and the real image.

Figure 4:
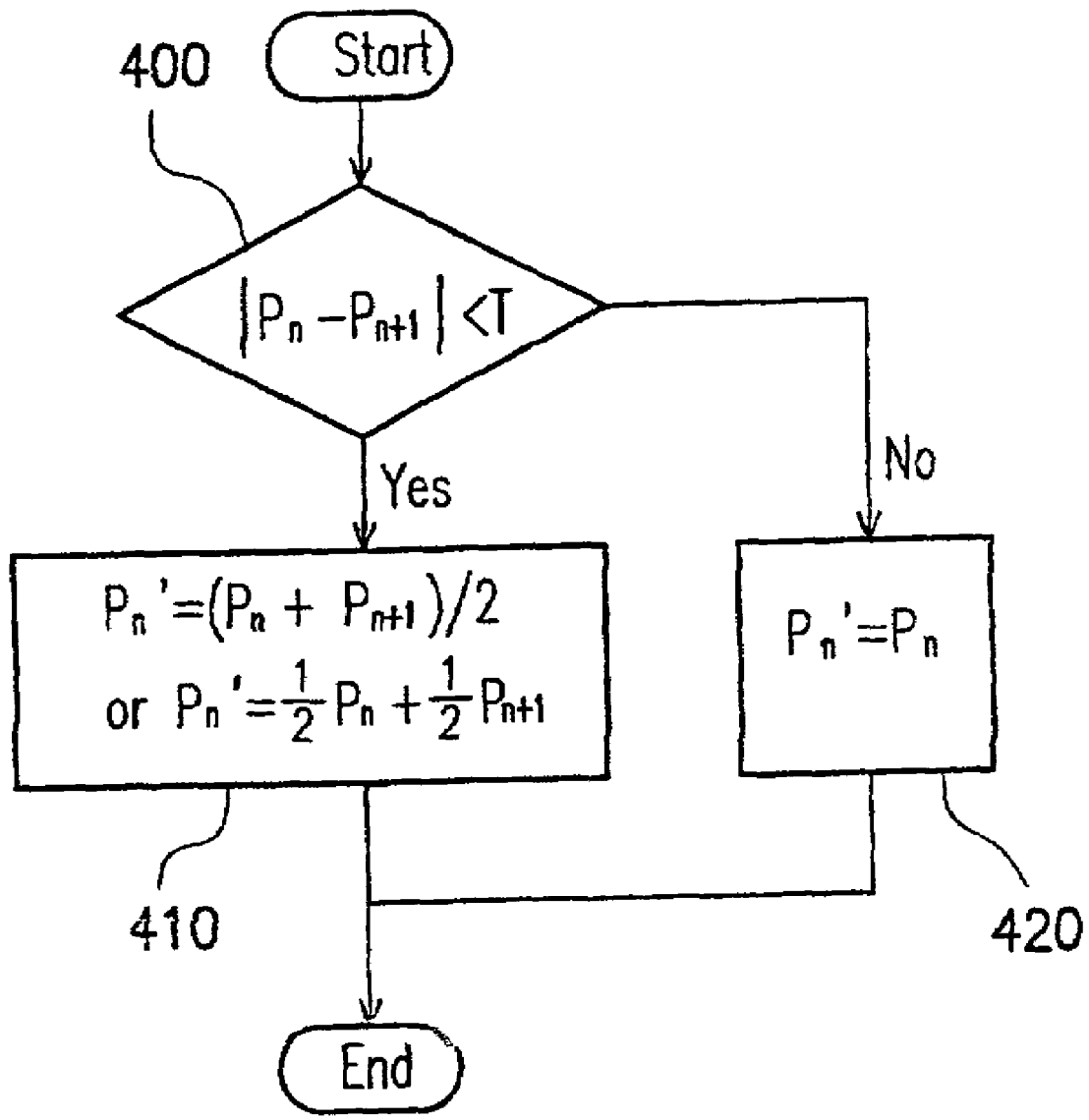
FIG. 4 shows a flow chart for a method of effacing a zipper image.

FIG. 4 shows a flow chart of effacing a zipper image according to the invention. In the following embodiment, a critical value used in the effacing process of the zipper image can be a predetermined value or a value generated by a logic circuit. In FIG. 4, assume that the nth (n is a positive integer) pixel obtained by scan on the scan line at which the zipper is produced is $P_n$, and the (n+1)th pixel obtained by scan on the scanning line is $P_{n+1}$. The nth pixel being processed is referred as $P_n'$, and the critical value is denoted as T. In this embodiment, whether $P_n$ subtracted by $P_{n+1}$ is smaller than T is determined in step 400. When the absolute value of $|P_n - P_{n+1}|$ is smaller than T, $P_n$ is modified as $P_n'$. The value of $P_n'$ can be expressed as $(P_n + P_{n+1})/2$ or $(½)P_n + (½)P_{n+1}$, as shown in step 410. The nth pixel after being processed as $P_n'$ approximates the gray values of the nth and (n+1)th pixel $P_n$ and $P_{n+1}$ obtained by scan, so that the zipper image can be effaced. When $|P_n - P_{n+1}|$ is larger than T, the effacing process is not performed.

The above embodiment compares two neighboring pixels at a scan line at which the zipper image is produced with a critical value as a reference for effacing process. If the effacing process is required, the gray values of these two neighboring pixels are approximated to each other to reduce the zipper image. However, the modulation transfer function of the scanner with the stagger charge-coupled device is slightly reduced.

According to the above, the invention has the following advantages:

1. Only a critical value is required to determine whether an effacing process is performed, thereby, two gray scales of two neighboring pixels are approximated to each other, and the zipper image is effaced.

2. The fabrication cost is not increased.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A scanner configured to:
generate pixels of a scan line, wherein the scan line is produced by an image sensor, and wherein the pixels comprise an nth pixel value and an adjacent (n+1)th pixel value;
calculate an absolute value of a difference between the nth and the (n+1)th pixel values, and
selectively modify, according to a result of the calculation, the nth pixel value to be one half of a sum of the values of the nth and (n+1)th pixels.

2. The scanner of claim 1, wherein the nth pixel value is modified when the absolute value of the difference between the nth and the (n+1)th pixel values is less than a critical value.

3. The scanner of claim 1, wherein a pixel value of a pixel comprises a gray scale of the pixel.

4. The scanner of claim 1, wherein the scanner is further configured to correct a zipper error of a scanned image.

5. The scanner of claim 1, wherein the image sensor comprises a stagger charge-coupled device.

6. An apparatus comprising:
means for producing a line of pixel values associated with a scanned image through the use of an image sensor, wherein a pixel value of a pixel comprises a gray scale of the pixel;
means for calculating an absolute value of a difference between a first pixel value of a first pixel and a second pixel value of a second pixel, wherein the second pixel is adjacent to the first pixel; and
means for selectively modifying, according to a result of the means for calculating, the first pixel value to approximate the gray scales of the two adjacent pixels.

7. The apparatus of claim 6, wherein the first pixel value is modified as substantially one half of a sum of the first pixel value and the second pixel value.

8. The apparatus of claim 6, wherein the first pixel value is modified when the absolute value is less than a critical value.

9. The apparatus of claim 8, wherein the critical value is a predetermined value.

10. The apparatus of claim 8, further comprising means for adjusting the critical value according to a modulation transfer function.

11. A scanner configured to:
scan an image, wherein the image is scanned by an image sensor of the scanner;
process the image to obtain a plurality of pixel values of the image;
determine an absolute value of a difference between an nth pixel value and an adjacent (n+1)th pixel value; and
modify the nth pixel value in response to the absolute value being less than a critical value.

12. The scanner of claim 11, wherein the modified nth pixel value substantially equals the sum of one half of the nth pixel value and one half of the (n+1)th pixel value.

13. The scanner of claim 11, further configured to:
determine whether the absolute value exceeds the critical value.

14. The scanner of claim 13, further configured to:
retain the nth pixel value in response to the absolute value exceeding the critical value.

15. The scanner of claim 11, further configured to correct a zipper error of a scanned image.

16. The scanner of claim 11, wherein the critical value comprises a predetermined value.

17. The scanner of claim 11, further configured to:
generate the critical value according to a modulation transfer function.

18. The scanner of claim 11, further configured to:
adjust the critical value according to a modulation transfer function.

19. The scanner of claim 11, further comprising an Application Specific Integrated Circuit (ASIC).

* * * * *